(12) United States Patent
Sinha et al.

(10) Patent No.: US 11,842,463 B2
(45) Date of Patent: Dec. 12, 2023

(54) DEBLURRING MOTION IN VIDEOS

(71) Applicant: Adobe Inc., San Jose, CA (US)

(72) Inventors: Shobhit Sinha, Jersey City, NJ (US); Aarsh Agarwal, Uttar Pradesh (IN); Shubhi Gupta, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 236 days.

(21) Appl. No.: 17/338,189

(22) Filed: Jun. 3, 2021

(65) Prior Publication Data
US 2022/0392021 A1 Dec. 8, 2022

(51) Int. Cl.
*G06T 5/00* (2006.01)
*G06V 20/40* (2022.01)
*G06N 3/045* (2023.01)

(52) U.S. Cl.
CPC .............. *G06T 5/003* (2013.01); *G06N 3/045* (2023.01); *G06V 20/46* (2022.01)

(58) Field of Classification Search
CPC ...... G06V 10/454; G06V 10/82; G06V 20/46; G06V 10/44; G06V 40/168; G06V 10/40; G06V 10/7715; G06N 3/045; G06T 5/003; G06T 5/002; G06T 7/73; G06T 3/4046; G06T 2207/20182; G06T 2207/20032; G06T 7/30
See application file for complete search history.

(56) References Cited

U.S. PATENT DOCUMENTS

| | | | |
|---|---|---|---|
| 10,289,951 B2* | 5/2019 | Wang | G06V 10/774 |
| 11,727,539 B1* | 8/2023 | Krishnamurthy | G06T 9/00 |
| 2019/0356715 A1* | 11/2019 | Rands | H04M 1/72403 |

OTHER PUBLICATIONS

Zhou et al, Spatio-Temporal Filter Adaptive Network for Video Deblurring, ICCV (Year: 2019).*
Niklaus et al, Video Frame Interpolation via Adaptive Separable Convolution, arXiv:1708.01692v1 Aug. 5 (Year: 2017).*
He et al, Deep Residual Learning for Image Recognition, CVPR (Year: 2016).*

* cited by examiner

*Primary Examiner* — Ping Y Hsieh
*Assistant Examiner* — Xiao Liu
(74) *Attorney, Agent, or Firm* — NICHOLSON DE VOS WEBSTER & ELLIOT LLP

(57) ABSTRACT

Embodiments are disclosed for deblurring motion in video. A method of deblurring motion in video can include receiving an input frame from a digital video, extracting a plurality of features of the input frame using an encoder network, determining, using a neural network, a plurality of spatial alignment kernels and a plurality of deblur kernels each corresponding to a feature of the input frame, wherein the plurality of spatial alignment kernels include different sizes of spatial alignment kernels and wherein the plurality of deblur kernels include different sizes of deblur kernels, generating, by the neural network, a plurality of output features for the input frame using the plurality of spatial alignment kernels and the plurality of deblur kernels, and generating a deblurred output frame from the plurality of output features using a decoder network.

18 Claims, 12 Drawing Sheets

DEBLURRING MOTION IN VIDEOS

BACKGROUND

Videos have become an integral part of our lives. With the advent of smartphone technology, it has recently become possible to take high-quality photos using relatively inexpensive equipment. However, due to the limitations of these devices, the image data captured by these devices often turns out to be blurry and spatially inconsistent, especially when attempting to capture motion. Such motion blur can be introduced due to a number of sources, such as low aperture, camera shake, focus hunt due to the motion of the object, depth variation, low resolution, or blurry camera, etc. Additionally, smaller, and less expensive variants of hardware elements can result in noisy imaging, especially in low light conditions. Avoiding blur in such scenarios is almost impossible.

Video processing systems typically offer some form of deblurring tools to make blurry videos sharper. However, these existing techniques are cumbersome and time consuming. For example, existing optical flow-based techniques require a large number of parameters to be tuned, making such techniques tedious and requiring a significant amount of knowledge to be used effectively, while still often generating less than satisfying results. For example, optical flow-based techniques result in limited improvement when dealing with any more than minimal blur, or in low or dimly lit environments. They also tend to generate artifacts or cannot effectively remove blur when the estimated optical flow is not accurate. Existing deep learning-based techniques are limited by memory demand, leading to subpar results.

These and other problems exist with regard to deblurring motion in videos in electronic systems.

SUMMARY

Introduced here are techniques/technologies that improve deblur performance in digital videos. Embodiments use a multi kernel adaptive separable convolution network (MKASCN) which predicts multiple different sized kernels to improve deblur performance. For example, three (or more, or fewer) kernel sizes may be used when processing frames of a digital video. This provides improved deblurring as larger kernels more accurately capture larger motions, while smaller kernels more accurately capture smaller motions. However, the memory demand for storing the kernel data increases with kernel size. By using separable kernels, resource demand is reduced, allowing for the deblur performance improvements available through the use of different sized kernels without leading to a resource bottleneck.

The MKASCN is an end-to-end trainable network trained using a perceptual loss function to predict deblur kernels and spatial alignment kernels. Because a video inherently includes spatial information across frames, by processing the frames of a video to be deblurred sequentially, this spatial information is leveraged, also improving deblur performance.

Additionally, in some embodiments, the different sized kernels are padded so that they are all of the same size (e.g., equal in size to the largest kernel). The kernels are then averaged, and the resulting average kernel is convolved with the video frame data. This reduces the computational resource requirements by avoiding performing multiple convolutions, without sacrificing quality.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a video processing system that uses machine learning to deblur motion in videos. In particular, one or more embodiments use a multi kernel adaptive separable convolutional network which provides improved deblurring via the use of different sized kernels as well as improved processing by the use of separable filters.

Existing deep learning techniques use encoder-decoder networks and kernel prediction filters to estimate adaptive optical flow and deblur videos. However, these techniques use kernel filters of fixed sizes in order to avoid computational and memory bottlenecks. These prior techniques therefore do not perform well where there is significant motion (e.g., of the camera, of objects in frame, or both) or in less-than-ideal conditions (e.g., low, or dimly lit environments).

Embodiments address the deficiencies of prior techniques through the use of multiple, different sized kernels. This provides improved deblurring as larger kernels more accurately capture larger motions, while smaller kernels more accurately capture smaller motions. However, the memory demand for storing the kernel data is significant and increases quadratically with kernel size. This demand is further increased by the use of multiple different sized kernels for each pixel of an input frame. Separable filters are used to address this memory demand. Separable filters, also referred to herein as separable kernels, comprise pairs of one-dimensional kernels (e.g., one horizontal and one vertical, which are predicted instead of a complete two-dimensional kernel. The pair of one-dimensional kernels may be combined to obtain a two-dimensional kernel. This reduces the memory footprint of each kernel to two one-dimensional kernels. Additionally, the multi kernel adaptive separable convolutional network performs both deblurring and spatial alignment, improving overall deblur performance.

Figure 1:
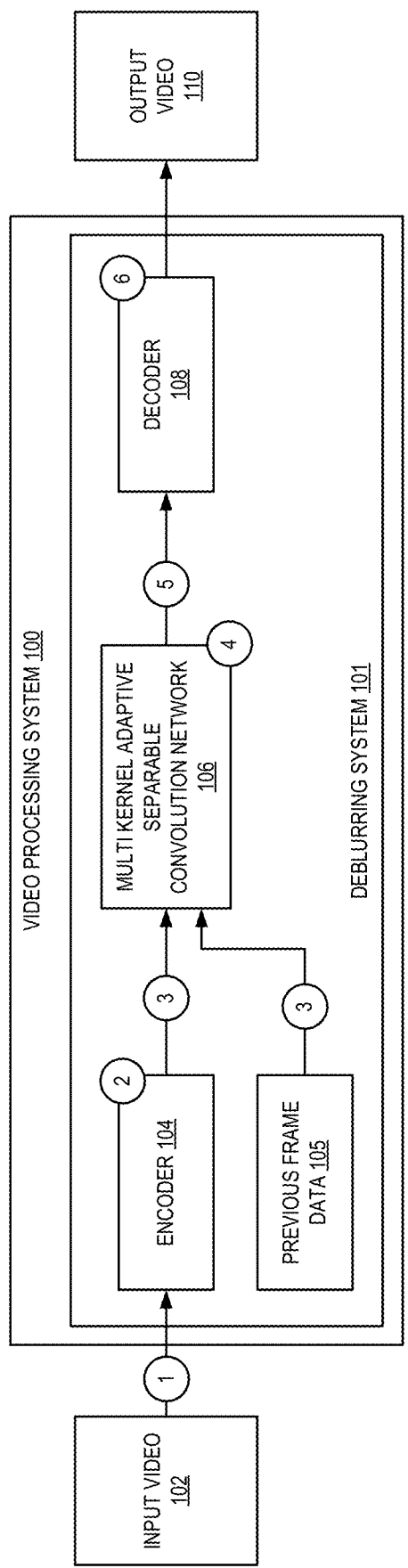
FIG. 1 illustrates a diagram of a process of deblurring motion in videos in accordance with one or more embodiments.

FIG. 1 illustrates a diagram of a process of deblurring motion in videos in accordance with one or more embodiments. As shown in FIG. 1, video processing system 100 includes a deblurring system 101 which performs deep learning-based deblurring and spatial alignment on blurry videos. The deblurring system 101 receives an input video 102 that includes blurry content. The input video 102 may be a digital video comprising a plurality of frames. In various embodiments, digital video can include any digital visual media comprising a plurality of frames which, when played, comprises a moving visual representation (or image) of a story, event, picture, illustration, icon, and/or symbol. To illustrate, a digital video can include, but is not limited to, a digital file with the following file extensions: FLV, SWF, AVI, WMV, MOV, QT, MKV, MP4, or AVCHD.

In some embodiments, video processing system 100 may be implemented as part of a cloud-based image and/or video processing suite of software. The user may access such a video processing system via a client application executing on their computing device (e.g., a desktop, laptop, mobile device, etc.). In some embodiments, the client application (or "app") may be an application provided by the video processing system (or a service provider corresponding to the video processing system or other entity). Additionally, or alternatively, the user may access the video processing system via a browser-based application executing in a web browser installed on the user's computing device. The user may provide the video to be deblurred to the video processing system 100 by uploading the video to the video processing system directly or uploading the video to a cloud-based storage location (or other Internet-accessible storage location) and providing a reference (e.g., a URL, URI, or other reference) to the video to the video processing system. Additionally, or alternatively, the video processing system 100 may be implemented entirely or in part on the user's computing device.

As shown in FIG. 1, at numeral 1, input video 102 is provided to encoder 104. Encoder 104 may be a neural network. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the image processing system are discussed below.

The encoder 104 processes each frame of the input video and extracts low level features from the frames, at numeral 2. The low-level features of the current frame, along with previous frame data 105 is provided to multi kernel adaptive separable convolution network (MKASCN) 106 at numeral 3. As discussed further below, the MKASCN 106 can receive the current blurry frame, the previous blurry frame, and the previous deblurred output frame as input. In some embodiments, these frames may be stacked, provided as separate channels, or otherwise combined before being passed through encoder 104 to obtain combined low-level features. In some embodiments, each frame may be passed through encoder 104 and the resulting features concatenated or otherwise combined and provided to MKASCN 106.

MKASCN 106 is an end-to-end trainable deep neural network. The downsampled features obtained from the encoder are spatially aligned and deblurred recurrently by predicting separable spatial alignment kernel coefficients and separable deblur kernel coefficients. These kernels are then used to align and deblur the low-level features obtained from the frames of the input video, at numeral 4. This recurrent structure helps to carry the spatial alignment information successively over the frames. These resulting output features are then provided to decoder 108 at numeral 5. At numeral 6, decoder 108 upscales the output features to generate the sharp, deblurred output frame. This processing continues until all input frames of input video 102 have been processed, resulting in output video 110.

Figure 2:
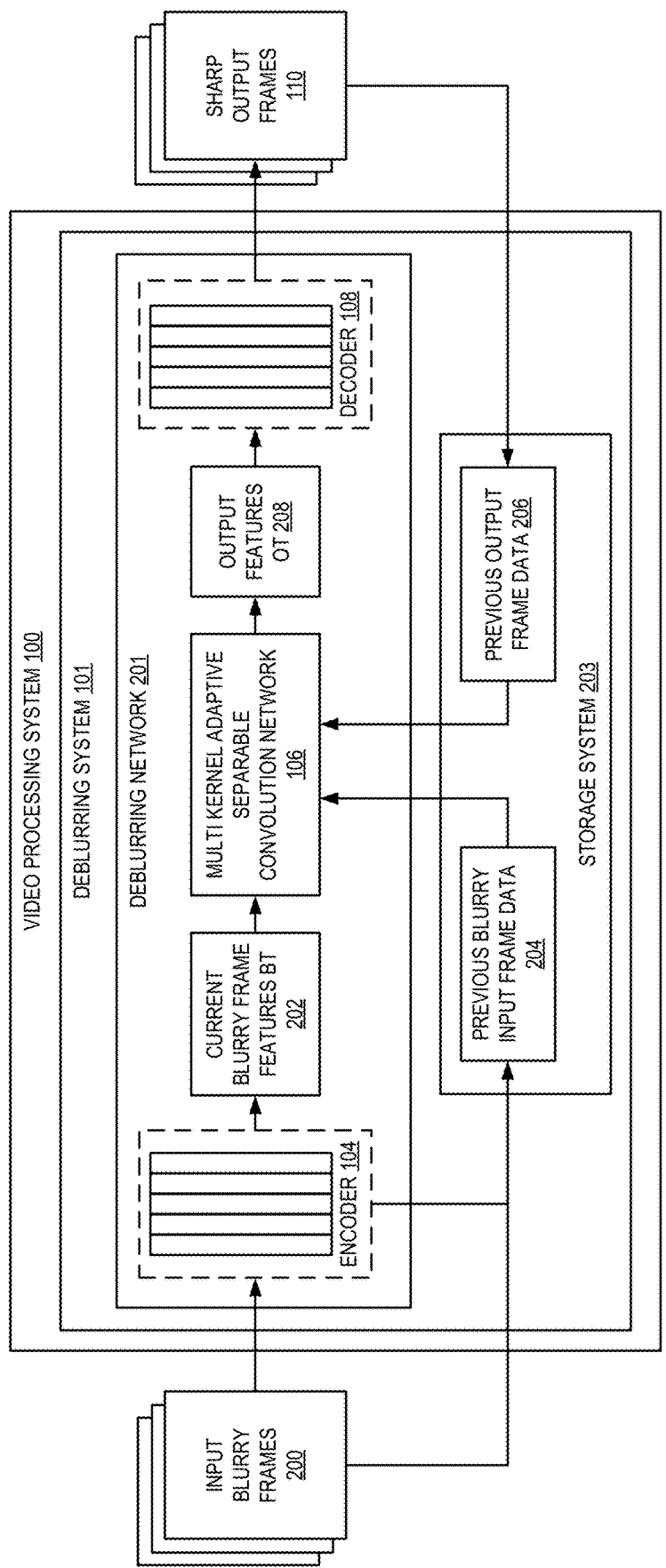
FIG. 2 illustrates a diagram of a deep learning architecture for deblurring motion in videos, in accordance with one or more embodiments.

FIG. 2 illustrates a diagram of a deep learning architecture for deblurring motion in videos, in accordance with one or more embodiments. As discussed, an input video is a digital video comprising a plurality of frames. All or some of these frames may include blurry frames due to, e.g., movement of the camera, movement of an object depicted in the video, etc. As discussed, a user may provide the input video to deblurring system 101 to be deblurred. Depending on how the video processing system is implemented, this may include searching a file system and selecting the video to be deblurred, uploading the video to the video processing system or a storage location accessible to the video processing system, etc. In various embodiments, the user may access the video processing system and deblur system via a client application, such as a standalone application, browser, etc.

As shown in FIG. 2, deblurring system 101 includes a deblurring network 201 and a storage system 203. The deblurring network 201 is an end-to-end trained deep neural network that recurrently predicts different sized deblur and spatial alignment kernels to produce a sharpened output video. Once the video has been provided to the video processing system 100, all or some of the frames of the video (e.g., input blurry frames 200) can be processed by the video processing system 100. For example, the entire video may be processed. Alternatively, the user may select a contiguous portion or portions of the video to be processed. In such embodiments, input blurry frames 200 may represent a subset of the entire video, such as an individual scene or other portion of the video with substantial blur.

As discussed, the input blurry frames 200 are sequentially provided to video processing system 100. In some embodiments, the input blurry frames 200 are maintained in storage system 203 or other storage system or storage service. Alternatively, input blurry frames 200 may be streamed to the video processing system 100 from a different storage location, such as an Internet-accessible storage location. In some embodiments, each frame is temporarily stored in storage system 203 to be used when processing a subsequent frame. In various embodiments, storage system 203 may include a local file system, remote or otherwise network-accessible file system, a local or remote storage service, etc. By processing the frames sequentially, the spatial information that is conveyed from frame to frame can be used by MKASCN 106 to improve spatial alignment and deblurring.

Each input blurry frame is first processed by encoder 104 which extracts feature information from the input blurry frame. This current blurry frame feature data $B_t$ 202 is provided to MKASCN 106 along with previous blurry input frame data 204 and previous output frame data 206. As shown in FIG. 2, in some embodiments, the current blurry frame feature data $B_t$ 202 is also stored in storage system 203 to be used in processing of subsequent frames. Although storage system 203 is shown as part of deblurring system 101, in various embodiments storage system 203 may be provided by video processing system 100 or by a separate system, service provider, etc. For the first frame of a video being processed, there is no previous frame data. In such instance, dummy data (e.g., randomly generated data) can be provided instead. The MKASCN 106 then processes the current and previous frame data together to generate output features $O_t$ 208, as discussed further with respect at least to FIG. 3. The output features are then provided to decoder 108 which reconstructs the deblurred current output frame. In some embodiments, the previous frame data 204 may include previous input blurry frames and/or features that were extracted from the previous blurry frames. Similarly, the previous output frame data 206 can include the deblurred output frames and/or the output features corresponding to those frames. This data may be stored locally on a storage device accessible to the video processing system, in memory of the storage processing system, or other location. In some embodiments, only the data from the immediately prior frame is retained. Alternatively, the data from a sliding window of prior frames are stored and discarded as processing moves through the frames of the input video.

Figure 3:
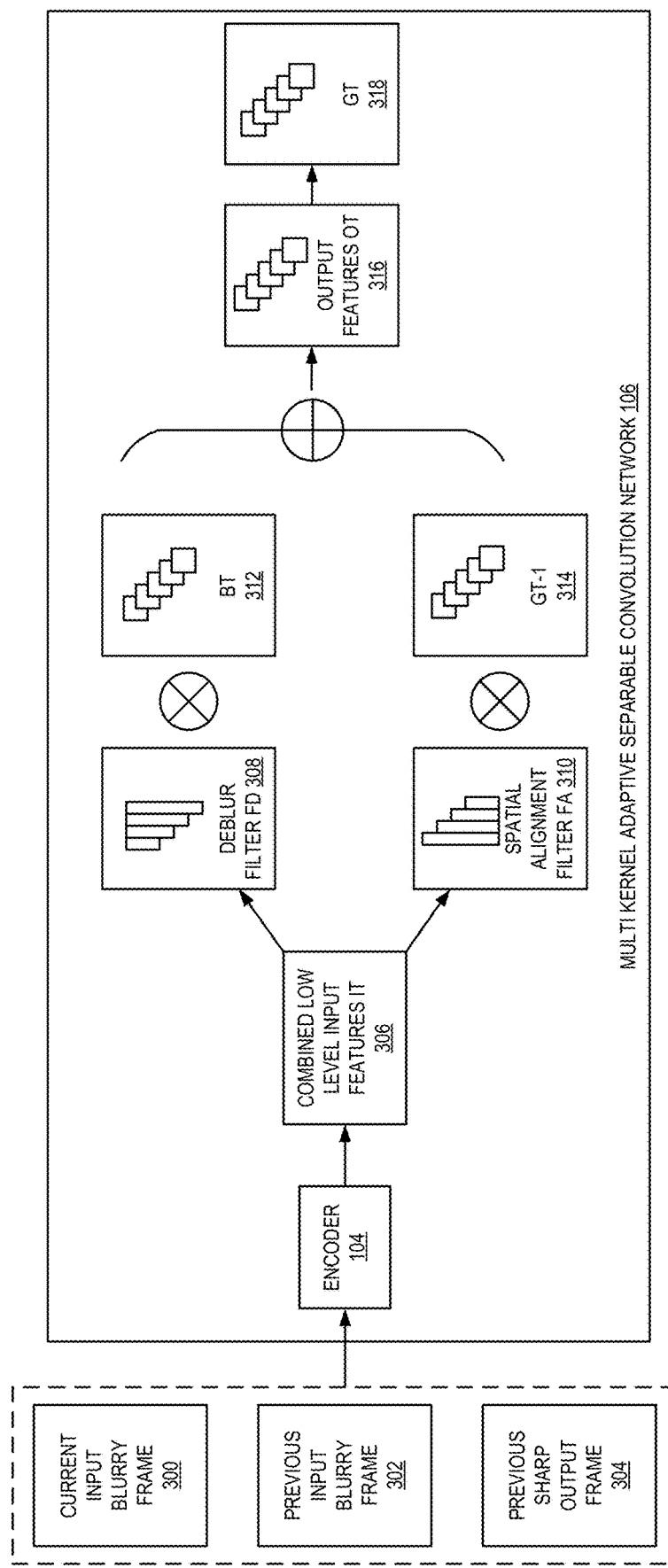
FIG. 3 illustrates a diagram of a deep learning architecture for a multi-kernel adaptive separable convolution network, in accordance with one or more embodiments.

FIG. 3 illustrates a diagram of a deep learning architecture for a multi-kernel adaptive separable convolution network, in accordance with one or more embodiments. Additional details regarding the MKASCN 106 are shown in FIG. 3. As shown, the MKASCN 106 comprises a deep learning architecture that enables deblur filters and spatial alignment filters to be predicted recurrently. Embodiments use separable multi-kernel filters for spatial alignment and for deblurring. As discussed, the input to the MKASCN 106 can include the current input blurry frame 300, the previous input blurry frame 302, and the previous sharp output frame 304 (e.g., the output frame corresponding to the previous input blurry frame). These frames are combined into a single input. For example, they may be stacked (e.g., overlaid on top of each other), added as separate channels, or otherwise combined). This combined input is provided to encoder 104. In some embodiments, this is the same encoder 104 as shown in FIGS. 1 and 2. Alternatively, in some embodiments, the MKASCN 106 may include a different encoder. The encoder processes the combined input and generates combined low level input features $I_t$ 306. For each low-level feature point obtained from encoder 104, the MKASCN 106 predicts a set of separable kernels filters. These filters are convolved with the patch around the corresponding low-level feature and averaged to produce the corresponding outputs.

For example, for a feature tensor T of size (h×w×c), a set of kernels is predicted. This set of kernels may include a plurality of different kernel sizes. Embodiments are described herein with reference to a set of three kernels $k_1$, $k_2$ and $k_3$, however more or fewer kernels may be included in a given implementation. For each kernel size $k_i$, a generated filter Fi of dimension (h×w×c×$k_i$×$k_i$) is predicted. As a result, the MKASCN 106 predicts a convolution filter of size c×$k_i$×$k_i$ for each element of tensor T. The predicted filters can be patch convolved with corresponding elements of the tensor to produce output tensor $P_i$ of dimension (h×w×c), corresponding to each kernel size $k_i$. Finally, the tensor's $P_i$s are averaged to produce the final output.

As shown in FIG. 3, the low-level features from current blurry frame $B_t$, are extracted using the encoder 104. The current blurry frame ($B_t$) along with previous blurry frame ($B_{t-1}$) and its deblurred output frame are downsampled using the same encoder 104 resulting in input tensor $I_t$ 306. The input tensor $I_t$ 306 is used by MKASCN 106 to predict multiple spatial alignment kernel filters {$FA_i$} 310 as well as multiple deblur filters {$FD_i$} 308 for kernel sizes of {$k_i$}.

Multiple kernel sizes improve over a single rigid kernel size as the smaller kernel sizes is able to capture micro level sharp details while the larger kernel sizes preserve macro level uniform patches. This in turn reduces the chances of artifacts while maintaining the sharp micro details. It also helps in capturing spatial consistencies during various lighting conditions in videos.

Predicting and storing multiple kernel filters requires significant computational resources both during training as well as at inference time. This is required both for the processing required to predict the kernels as well as the memory required to store the kernels. To reduce this resource cost and to reduce the model size, instead of predicting matrix of size $k_i$×$k_i$ for each feature data, embodiments predict separable kernels which comprise two linear vectors of size $k_i$. These one-dimensional vectors are then combined to generate the desired $k_i$×$k_i$ filter matrix. For example, the cross product of those linear vectors may be computed to produce the desired filter kernel. This reduces the filter parameters from $k_i^2$ to $2 \cdot k_i$, for each kernel.

Furthermore, embodiments alter the steps of patch convolution and averaging while applying these filters. As shown in FIG. 3, the predicted deblur filter kernels 308 are combined with the features of the current blurry frame $B_t$ 312 and the predicted spatial alignment filter kernels 310 are combined with the features of the previous sharp output frame $G_t-1$ 314. Instead of performing patch convolution and then averaging over the outputs, embodiments can pad the kernel filters appropriately and average them first. For example, each kernel that is smaller than the largest kernel size, is padded such that all of the kernels are the same size. Various padding schemes may be used. In some embodiments, each smaller kernel is zero-padded. The kernels (e.g., the largest kernel and the padded kernels) are then averaged, resulting in a single averaged filter kernel of the size of kernel with the maximum size. This averaged filter can then be applied to its corresponding features (e.g., the average deblur filter is convolved with $B_t$ 312 and the average spatial alignment filter is convolved with $G_t-1$ 314). Thus, rather than repeatedly convolving each kernel with the features, a single convolution step is performed using the average kernel. This saves significant computational resources without altering the forward pass, mathematically.

The output of the average deblur filter convolved with the blurry frame features $B_t$ 312 and the average spatial alignment filter with the previous output frame features $G_t-1$ 314 are then concatenated to produce output features $O_t$ 316. The output features $O_t$ 316 are then passed through a convolution filter to produce $G_t$ 318, the features of the current output frame which have been deblurred and spatially aligned. As discussed, these features are stored for use in processing the next frame at time t+1. Additionally, as discussed above, the output features $O_t$ 316 are provided to decoder 108 which generates the final deblurred frame.

Figure 4:
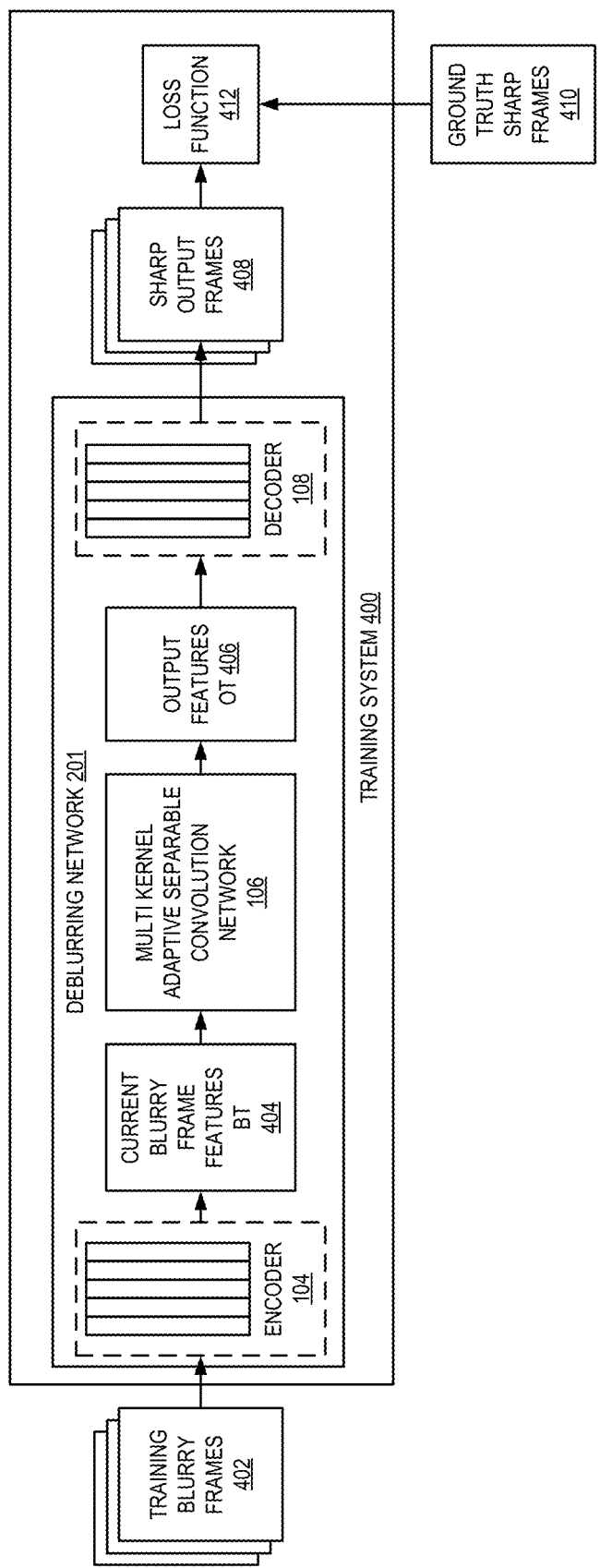
FIG. 4 illustrates a diagram of a training system for training a deep learning model to deblur motion in videos, in accordance with one or more embodiments.

FIG. 4 illustrates a diagram of a training system for training a deep learning model to deblur motion in videos, in accordance with one or more embodiments. The deblurring network 201 is trained end-to-end by training system 400. As shown in FIG. 4, the training data set includes training blurry frames 402 and corresponding ground truth sharp frames 410. During training, the blurry frames 402 are forward passed through the deblurring network 201 and the sharp output frames 408 are generated frame by frame. For example, as discussed above, the training blurry frames 402 are provided to encoder 104 sequentially. For each frame, the encoder 104 extracts current blurry frame features 404 and provides them to the multi kernel adaptive separable convolution network 106. The MKASCN 106 processes the current blurry frame features, and previous frame (blurry and sharp) features, as discussed above, to generate output features 406. These are then provided to decoder 108 which reconstructs the sharp output frames from the output features.

The sharp output frames 408 are compared against the sharp ground truth frames 410 and a loss 412 is calculated. This loss is propagated back in the deblurred network and the weights of the network are updated via backpropagation. Once trained, the weights of the network can be saved, and any blurry video can be forward passed through it and output frames can be combined to form the deblurred output video. In some embodiments, the loss function 412 is a perceptual loss function. In some embodiments, the loss function 412 can be sum of perceptual loss and mean squared loss. For example, the loss is calculated at each forward pass of the blurry frame and is propagated back in the network during training. The total loss between output frame 408 and ground truth frame 410 is calculated as a sum total of mean squared loss and perceptual loss. The mean squared loss may include the Euclidian distance between the output frame and the ground truth frame. The perceptual loss is calculated by passing both the output frame 408 and the corresponding ground truth frame 410 through a pretrained convolutional neural network (such as a VGG network) and taking the sum total of Euclidian distances between the outputs from the different layers of the CNN after passing the output frame and the ground truth frame.

For example, the loss function 412 can be expressed as $$\text{Loss} = \text{Mean Squared Loss} + \text{Perceptual Loss}$$

where $$\text{Mean Squared Loss} = \|O_t - S_t\|^2$$

$$\text{Perceptual Loss} = \sum_i \|VGG(O_t)_i - VGG(S_t)_i\|^2$$

Here, $S_t$ refers to the ground truth frame corresponding to the output frame $O_t$. $VGG(O_t)_i$ and $VGG(S_t)_i$ are the outputs from layer i of the VGG (or other CNN), after passing $O_t$ and $S_t$ through the network.

Figure 5:
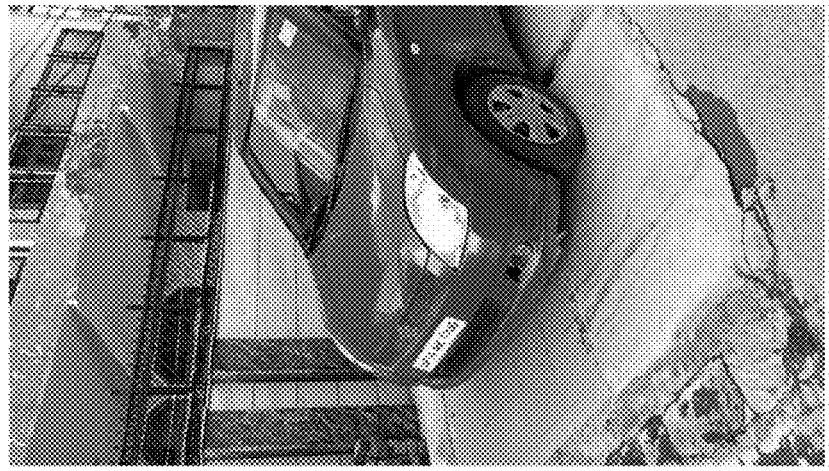
FIGS. 5-7 illustrate examples of deblurring frames of videos, in accordance with one or more embodiments.
Figure 5:
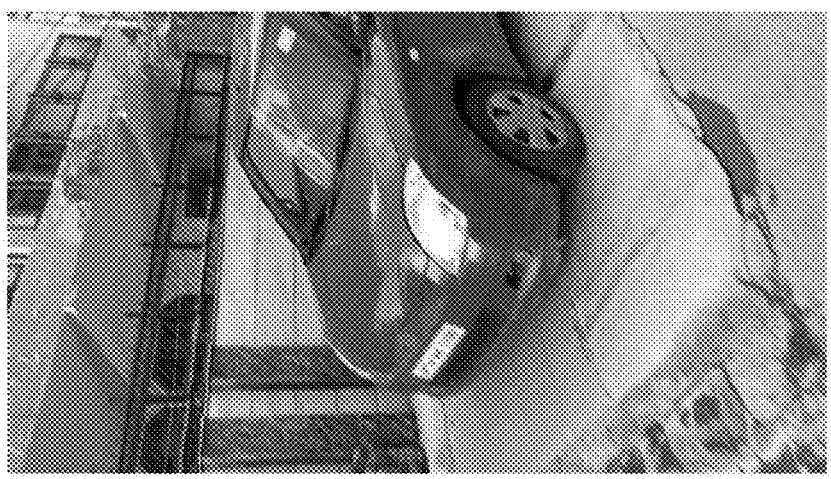
Figure 6:
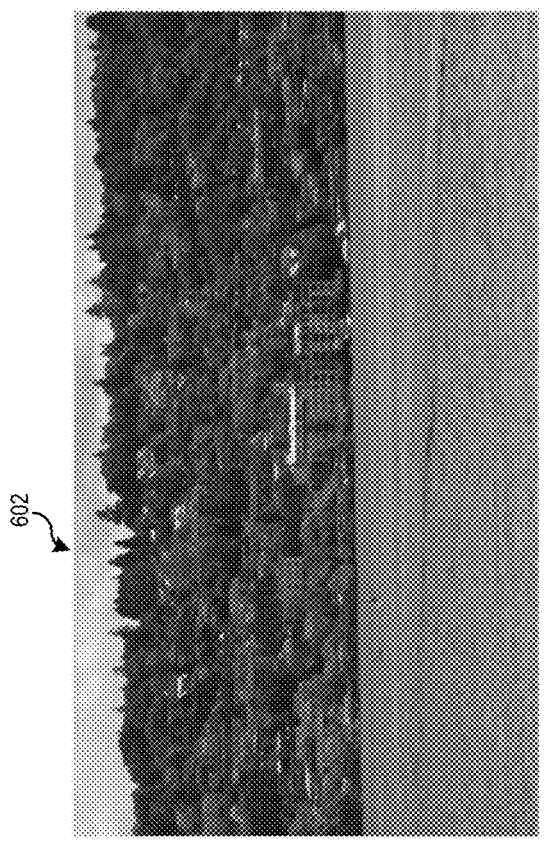
Figure 6:
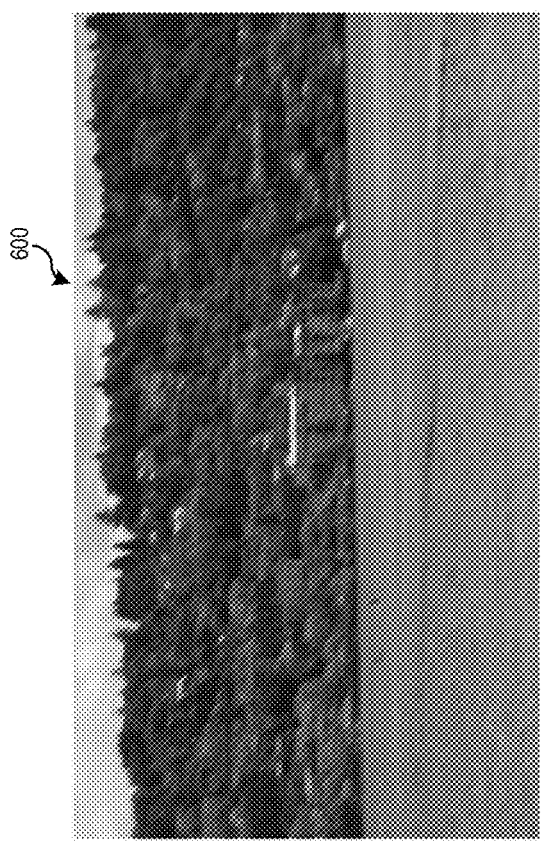
Figure 7:
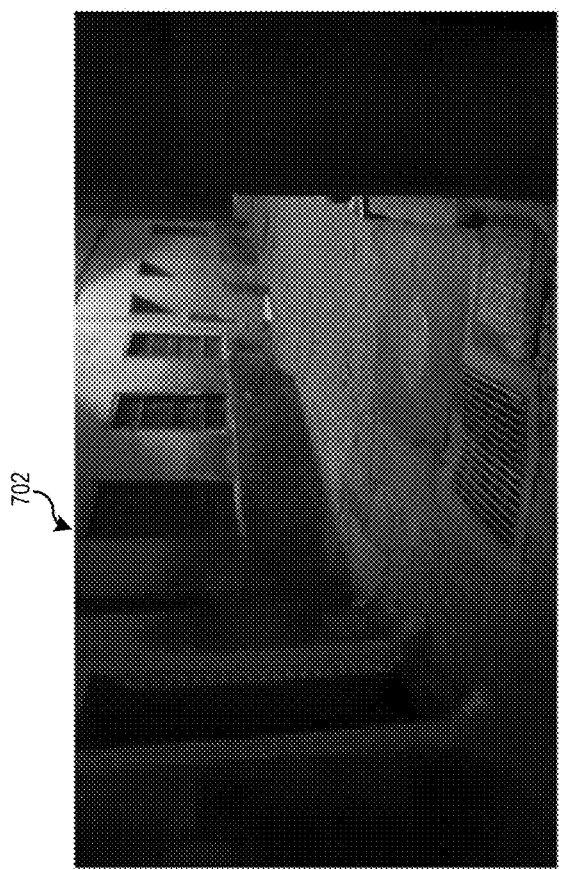
Figure 7:

FIGS. 5-7 illustrate examples of deblurring frames of videos, in accordance with one or more embodiments. FIG. 5 depicts frames extracted from a video of a stationary car. The input frame 500 is blurry, with missing details such as license plate, fence design, and ground texture. After passing the video through the deblurring network, a corresponding output frame 502 is extracted from the sharpened video. As shown in FIG. 5, the details that were obscured due to the blur of the input frame have now been significantly sharpened in the output frame, with the license plate, fence design, and ground texture all having been significantly improved.

FIG. 6 depicts frames extracted from a video captured by a moving source. It is difficult to clearly capture far away objects, such as the distant city shown in input frame 600. This difficulty is compounded due to the moving source, which often results in increased motion blur. After passing this video through the deblurring network, a corresponding output frame 602 is extracted from the sharpened video. As shown in output frame 602, the landscape detail and the building details have been significantly sharpened. The spatial alignment kernels and deblur kernels of the MKASCN greatly improve the sharpness of the output image 602, as shown in FIG. 6.

MKASCN additionally performs well in low light conditions. In the example of FIG. 7, the frames have been extracted from a video shot at night. The input video was blurry due to both the poor lighting as well as camera motion. This is illustrated in input frame 700 were the windows, doors, and manhole all display significant blurriness. However, after passing the blurry input video through the deblurring network, the output video is stabilized with sharper details around the windows, doors, and manhole, as shown in output frame 702.

Figure 8:
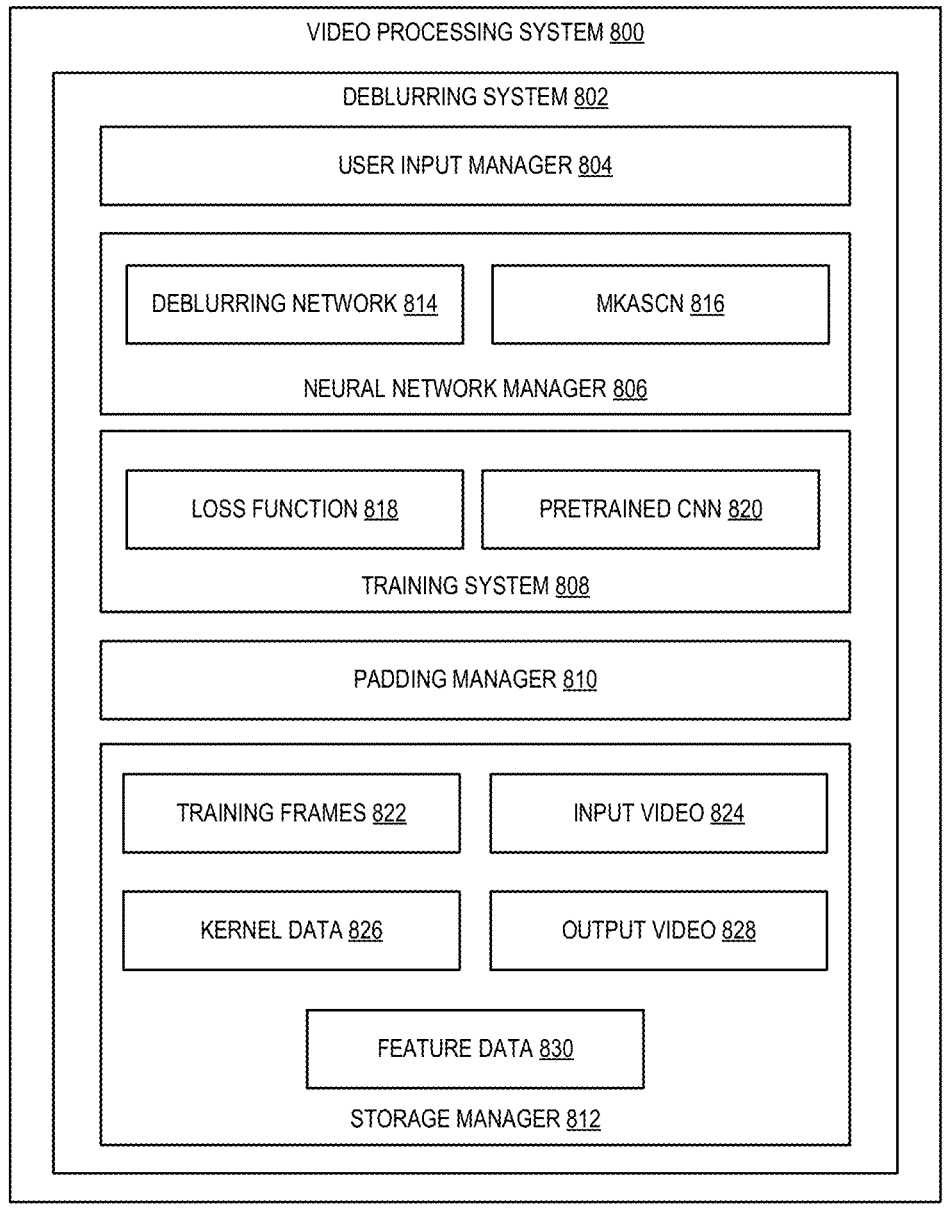
FIG. 8 illustrates a schematic diagram of a video processing system in accordance with one or more embodiments.

FIG. 8 illustrates a schematic diagram of a video processing system (e.g., "a video processing system" described above) in accordance with one or more embodiments. As shown, the video processing system 800 includes deblurring system 802 which may include, but is not limited to, user input manager 804, neural network manager 806, training system 808, padding manager 810, and storage manager 812. The neural network manager 806 includes a deblurring network 814, and a multi kernel adaptive separable convolution network (MKASCN) 816. The training system 808 includes a loss function 818 and a pretrained CNN 820. The storage manager 812 includes training frames 822, input video 824, kernel data 826, and output video 828.

The deblurring system 802 includes a user input manager 804 that allows users to provide input to the deblurring system and/or video processing system. For example, the user input manager 804 allows users to select videos to be deblurred. In some embodiments, the user input manager 804 enables a user to select a video file stored or accessible by storage manager 812, such as input video 824. In some embodiments, the user input manager 804 allows users to select specific portions of a video to be deblurred. For example, once a video has been selected, the user may select one or more portions of the video to be deblurred and the frames corresponding to those selected portions may be extracted and provided to the deblurring network for deblurring.

As further illustrated in FIG. 8, the deblurring system 802 further includes the neural network manager 806 that includes deblurring network 814 and MKASCN 816. As discussed, deblurring network 814 can be a neural network trained to deblur and spatially align input blurry videos. The deblurring network sequentially processes frames of the input blurry video by extracting low-level features of the current frame and passing the low-level features of the current frame along with previous frame data to the MKASCN 816. As discussed, the MKASCN 816 receives a stacked input of the input blurry frame, previous blurry frame, and previous output deblurred frame.

In some embodiments, this input includes the three frames stacked, combined as channels, or otherwise combined. This combined input is passed through an encoder which extracts combined low-level features from the combined input. The MKASCN 816 then estimates pairs of one-dimensional filter kernels for each feature point extracted from the combined input. As discussed, the MKASCN 816 predicts pairs of one-dimensional deblur filter kernels and pairs of one-dimensional spatial alignment filter kernels. For each feature point, the MKASCN 816 generates multiple pairs of one-dimensional filter kernels, corresponding to different sized kernels. This enables the smaller kernels to capture smaller movements and the larger kernels to capture larger movements, leading to improved deblurring results. Additionally, by using separable kernels, each predicted pair of one-dimensional kernels are combined to generate a corresponding filter kernel (either deblur or spatial alignment). This significantly reduces the resources required to maintain these kernels by significantly reducing the number of kernel coefficients needed to represent the kernels. These one-dimensional filter kernel pairs are stored as part of kernel data 826.

Once the one-dimensional kernels have been predicted, corresponding two-dimensional kernels are generated by combining the one-dimensional kernels. For example, the cross-product of each pair of kernels may be computed to calculate the corresponding two-dimensional filter kernel. The spatial alignment kernels are convolved with the previous deblurred frame (e.g., the feature vector that were calculated for the previous frame, as discussed above) and the deblur kernels are convolved with the current blurry frame (e.g., the feature vector extracted from the current blurry frame by the deblurring network). The results of these convolutions are then concatenated to generate the output features of the deblurred output frame. The output features are then passed through a convolution filter to produce the features of the current output frame which have been deblurred and spatially aligned to be used when processing subsequent frames. The current blurry frame features and the current deblurred output frame features can be stored in feature data 830 for use in processing the next frame.

In some embodiments, it is computationally expensive to convolve each different sized kernel with the corresponding frame data, and then averaging the results. Instead, in some embodiments, the kernels can be averaged and then the resulting averaged kernel can be convolved only once with the corresponding frame data. Padding manager 810 can be used to pad the kernels such that they are all the size of the largest kernel. As discussed, padding manager 810 receives the kernels and pads them using a padding scheme (such as zero padding, mirror padding, etc.). The padded kernels are then averaged, resulting in an averaged kernel. This averaged kernel is then convolved with the corresponding frame data to generate the output features.

Once the output features have been generated by the MKASCN 816, the are provided to a decoder of the deblurring network 814. The decoder uses the output features to reconstruct the output deblurred and spatially aligned frame. This processing continues until all frames of the input video 824 (or all selected frames) have been processed, resulting in output video 828.

As further illustrated in FIG. 8, the deblurring system 802 includes training system 808 which is configured to teach, guide, tune, and/or train one or more neural networks. In particular, the training system 808 trains a neural network, such as deblurring network 814 and MKASCN 816, based on a plurality of training data (e.g., training frames 822). In some embodiments, the training frames include frames of digital videos, including a series of sequential frames. A first frame is provided to the neural network which then learns to predict multiple sizes of separable kernel coefficients for both deblur kernels and spatial alignment kernels which, when applied in an adaptive separable convolution operation, generate an output deblurred and spatially aligned frame. More specifically, the training system 808 is configured to access, identify, generate, create, and/or determine training input and utilize the training input to train and fine-tune a neural network. For instance, the training system 808 trains the kernel prediction network to learn to predict the kernel coefficients using loss function 818. Loss function 818, as discussed above, may be a perceptual loss function. This loss is calculated by passing both the output frame and the corresponding ground truth frame through a pretrained convolutional neural network 820 (such as a VGG network) and taking the sum total of Euclidian distances between the outputs from the different layers of the pretrained CNN after passing the output frame and the ground truth frame. Training system 808 trains the deblurring network 814 and MKASCN 816 end-to-end to minimize the perceptual loss.

As illustrated in FIG. 8, the deblurring system 802 also includes the storage manager 812. The storage manager 812 maintains data for the deblurring system 802. The storage manager 812 can maintain data of any type, size, or kind as necessary to perform the functions of the deblurring system 802. The storage manager 810, as shown in FIG. 8, includes the training frames 822. The training frames 822 can include a plurality of digital training images associated with blurry videos, as discussed in additional detail above. In particular, in one or more embodiments, the training frames 822 include digital training images utilized by the neural training system 808 to train one or more neural networks to deblur blurry input videos. For example, the training frames 822 may include blurry frames and corresponding ground truth sharp frames.

As further illustrated in FIG. 8, the storage manager 810 also includes input video 824. Input video 824 can include information for any digital video that includes blurry content to be deblurred by deblurring system 802. For example, input video 824 includes a digital video provided by a user, where the user seeks to deblur at least a portion of the video. The storage manager 812 may also include kernel data 826. The kernel data 826 may include a plurality of pairs of one-dimensional kernels predicted by the MKASCN. As discussed, these may include pairs of one-dimensional kernels corresponding to different sized kernels of both deblur kernels and spatial alignment kernels. The storage manager 812 may further include output video 828. The output video 828 comprises output frames generated by the deblurring network and MKASCN after performing adaptive separable convolution operations on the input frames using the one-dimensional kernel pairs. The storage manager 812 may further include feature data 830, which may include feature vectors generated from the input blurry frames and previous frame data, as discussed above, for use in processing subsequent frames.

Each of the components 804-810 of the deblurring system 802 and their corresponding elements (as shown in FIG. 8) may be in communication with one another using any suitable communication technologies. It will be recognized that although components 804-812 and their corresponding elements are shown to be separate in FIG. 8, any of components 804-812 and their corresponding elements may be combined into fewer components, such as into a single facility or module, divided into more components, or configured into different components as may serve a particular embodiment.

The components 804-812 and their corresponding elements can comprise software, hardware, or both. For example, the components 804-812 and their corresponding elements can comprise one or more instructions stored on a computer-readable storage medium and executable by processors of one or more computing devices. When executed by the one or more processors, the computer-executable instructions of the deblurring system 802 can cause a client device and/or a server device to perform the methods described herein. Alternatively, the components 804-812 and their corresponding elements can comprise hardware, such as a special purpose processing device to perform a certain function or group of functions. Additionally, the components 804-812 and their corresponding elements can comprise a combination of computer-executable instructions and hardware.

Furthermore, the components 804-810 of the deblurring system 802 may, for example, be implemented as one or more stand-alone applications, as one or more modules of an application, as one or more plug-ins, as one or more library functions or functions that may be called by other applications, and/or as a cloud-computing model. Thus, the components 804-812 of the deblurring system 802 may be implemented as a stand-alone application, such as a desktop or mobile application. For example, video processing system 800 may be implemented as a standalone video processing application and deblurring system 802 may be implemented as part of the video processing application. Furthermore, the components 804-812 of deblurring system 802 may be implemented as one or more web-based applications hosted on a remote server. Alternatively, or additionally, the components of the deblurring system 802 may be implemented in a suite of mobile device applications or "apps." To illustrate, the components of the deblurring system 802 may be implemented in a video or image processing application, including but not limited to ADOBE® AFTER EFFECTS®, ADOBE® PREMIERE® PRO, ADOBE® LIGHTROOM®, ADOBE® LIGHTROOM® FOR MOBILE, ADOBE® PHOTOSHOP®, ADOBE® PREMIERE® ELEMENTS, ADOBE® CREATIVE CLOUD®. "ADOBE®", "AFTER EFFECTS®", "PREMIERE® PRO", "LIGHTROOM®", "LIGHTROOM® FOR MOBILE", "PHOTOSHOP®", "PREMIERE® ELEMENTS", and "CREATIVE CLOUD®" are either registered trademarks or trademarks of Adobe Inc. in the United States and/or other countries.

Figure 9:
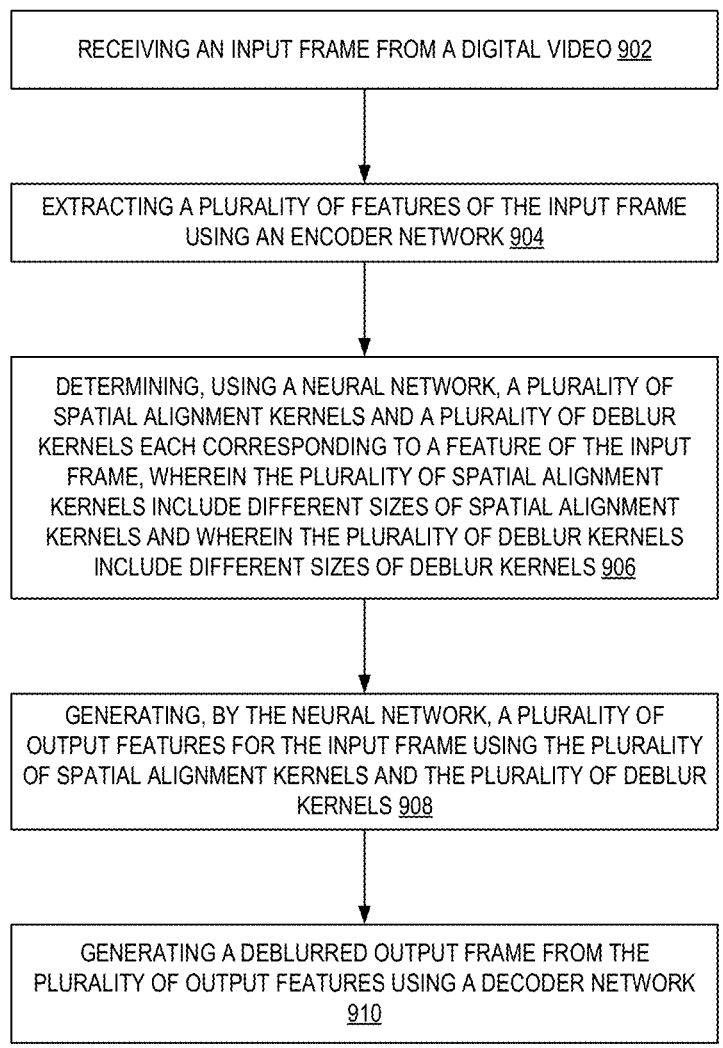
FIG. 9 illustrates a flowchart of a series of acts in a method of deblurring motion in videos in accordance with one or more embodiments.
Figure 10:
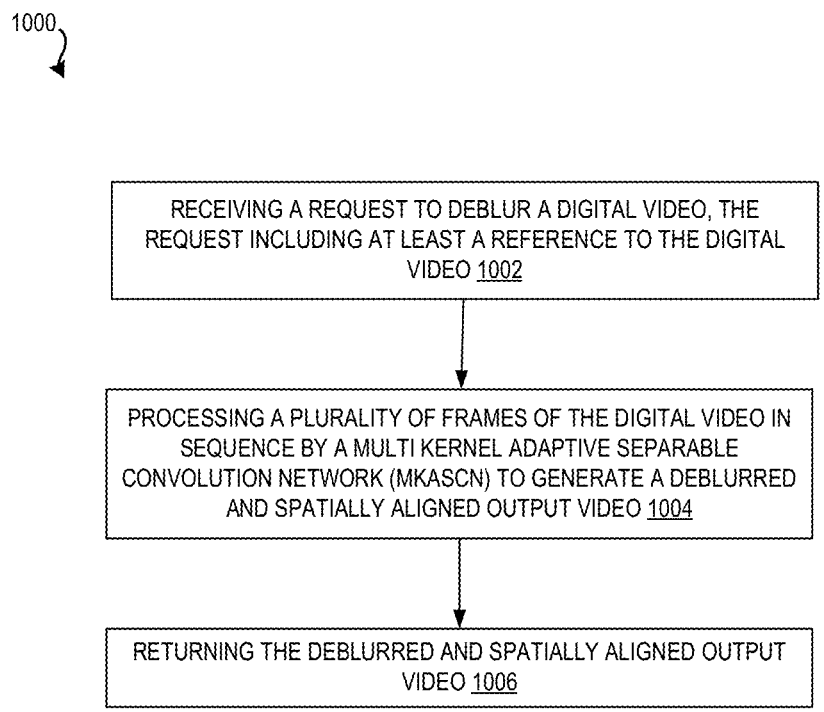
FIG. 10 illustrates a flowchart 1000 of a series of acts in a method of deblurring motion in videos in accordance with one or more embodiments.

FIGS. 1-8, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIGS. 9 and 10 illustrate flowcharts of exemplary methods in accordance with one or more embodiments. The methods described in relation to FIGS. 9 and 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of deblurring motion in videos in accordance with one or more embodiments. In one or more embodiments, the method 900 is performed in a digital medium environment that includes the deblurring system 802. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving an input frame from a digital video. The digital video may include a plurality of frames. In some embodiments, the input frame is a first frame of the digital video. In some embodiments, the input frame is a first frame of a selected portion of the digital video. As illustrated in FIG. 9, the method 900 includes an act 904 of extracting a plurality of features of the input frame using an encoder network.

As illustrated in FIG. 9, the method 900 includes an act 906 of determining, using a neural network, a plurality of spatial alignment kernels and a plurality of deblur kernels each corresponding to a feature of the input frame, wherein the plurality of spatial alignment kernels include different sizes of spatial alignment kernels and wherein the plurality of deblur kernels include different sizes of deblur kernels. In some embodiments, determining, using a neural network, a plurality of spatial alignment kernels and a plurality of deblur kernels each corresponding to a feature of the input frame, further includes providing a combined input to the neural network, the combined input including the input frame, a previous input frame, and a corresponding previous output frame, extracting a plurality of combined features from the combined input using the encoder network, predicting, by the neural network, a plurality of pairs of one-dimensional deblur filters corresponding to the plurality of deblur kernels for each feature from the plurality of combined features, and predicting, by the neural network, a plurality of pairs of one-dimensional spatial alignment filters corresponding to the plurality of spatial alignment kernels for each feature from the plurality of combined features. In some embodiments, the neural network is a multi kernel adaptive separable convolution network (MKASCN).

As illustrated in FIG. 9, the method 900 includes an act 908 of generating, by the neural network, a plurality of output features for the input frame using the plurality of spatial alignment kernels and the plurality of deblur kernels. In some embodiments, generating, by the neural network, a plurality of output features for the input frame using the plurality of spatial alignment kernels and the plurality of deblur kernels, further includes convolving the plurality of deblur kernels with the plurality of features of the input frame to obtain a first convolved result, convolving the plurality of spatial alignment kernels with a plurality of features of the previous output frame to obtain a second convolved result, and concatenating the first convolved result with the second convolved result to generate the plurality of output features.

As illustrated in FIG. 9, the method 900 includes an act 910 of generating a deblurred output frame from the plurality of output features using a decoder network. In some embodiments, this processing continues sequentially until all frames of the input video have been processed. For example, in some embodiments, the method further includes an act of sequentially processing each frame of the digital video to obtain a deblurred output video.

In some embodiments, convolving the plurality of deblur kernels with the plurality of features of the input frame to obtain a first convolved result, further includes padding the plurality of deblur kernels such that each of the plurality of deblur kernels is of equal size, averaging the plurality of padded deblur kernels, and convolving the average of the plurality of padded deblur kernels with the plurality of features of the input frame to obtain the first convolved result. In some embodiments, convolving the plurality of spatial alignment kernels with a plurality of features of the previous output frame to obtain a second convolved result, further includes padding the plurality of spatial alignment kernels such that each of the plurality of spatial alignment kernels is of equal size, averaging the plurality of padded spatial alignment kernels, and convolving the average of the plurality of padded spatial alignment kernels with the plurality of features of the previous output frame to obtain the second convolved result.

In some embodiments, the method further includes acts of downsampling the plurality of output features to generate a plurality of downsampled output features, storing the plurality of downsampled output features for processing a next frame, and storing the plurality of input features for processing the next frame.

FIG. 10 illustrates a flowchart 1000 of a series of acts in a method of deblurring motion in videos in accordance with one or more embodiments. In one or more embodiments, the method 1000 is performed in a digital medium environment that includes the deblurring system 802. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a request to deblur a digital video, the request including at least a reference to the digital video. For example, the user may send such a request using an application running on their electronic device (e.g., via a stand-alone application, browser application, etc.). In some embodiments, the digital video is then obtained using the reference. For example, using the reference to the digital video, such as a URL or URI, the digital video can be obtained from a network-accessible endpoint.

Alternatively, the digital video may be included with the request.

As illustrated in FIG. 10, the method 1000 includes an act 1004 processing a plurality of frames of the digital video in sequence by a multi kernel adaptive separable convolution network (MKASCN) to generate a deblurred and spatially aligned output video. In some embodiments, processing the plurality of frames using the MKASCN includes obtaining an input frame from a digital video, extracting a plurality of features of the input frame using an encoder network, determining, using a neural network, a plurality of spatial alignment kernels and a plurality of deblur kernels each corresponding to a feature of the input frame, wherein the plurality of spatial alignment kernels include different sizes of spatial alignment kernels and wherein the plurality of deblur kernels include different sizes of deblur kernels, generating, by the neural network, a plurality of output features for the input frame using the plurality of spatial alignment kernels and the plurality of deblur kernels, generating a deblurred output frame from the plurality of output features using a decoder network, and sequentially processing each frame of the digital video to obtain the deblurred and spatially aligned output video.

As illustrated in FIG. 10, the method 1000 includes an act 1006 returning the deblurred and spatially aligned output video. For example, the output video can be downloaded to the user's electronic device. In some embodiments, the output video can be streamed to the user's electronic device. Alternatively, the output video may be uploaded to a storage location specified by the user.

In some embodiments, determining a plurality of spatial alignment kernels and a plurality of deblur kernels each corresponding to a feature of the input frame, further includes providing a combined input to the neural network, the combined input including the input frame, a previous input frame, and a corresponding previous output frame, extracting a plurality of combined features from the combined input using the encoder network, predicting, by the neural network, a plurality of pairs of one-dimensional deblur filters corresponding to the plurality of deblur kernels for each feature from the plurality of combined features, and predicting, by the neural network, a plurality of pairs of one-dimensional spatial alignment filters corresponding to the plurality of spatial alignment kernels for each feature from the plurality of combined features.

In some embodiments, generating a plurality of output features for the input frame using the plurality of spatial alignment kernels and the plurality of deblur kernels further includes convolving the plurality of deblur kernels with the plurality of features of the input frame to obtain a first convolved result, convolving the plurality of spatial alignment kernels with a plurality of features of the previous output frame to obtain a second convolved result, and concatenating the first convolved result with the second convolved result to generate the plurality of output features.

Figure 11:
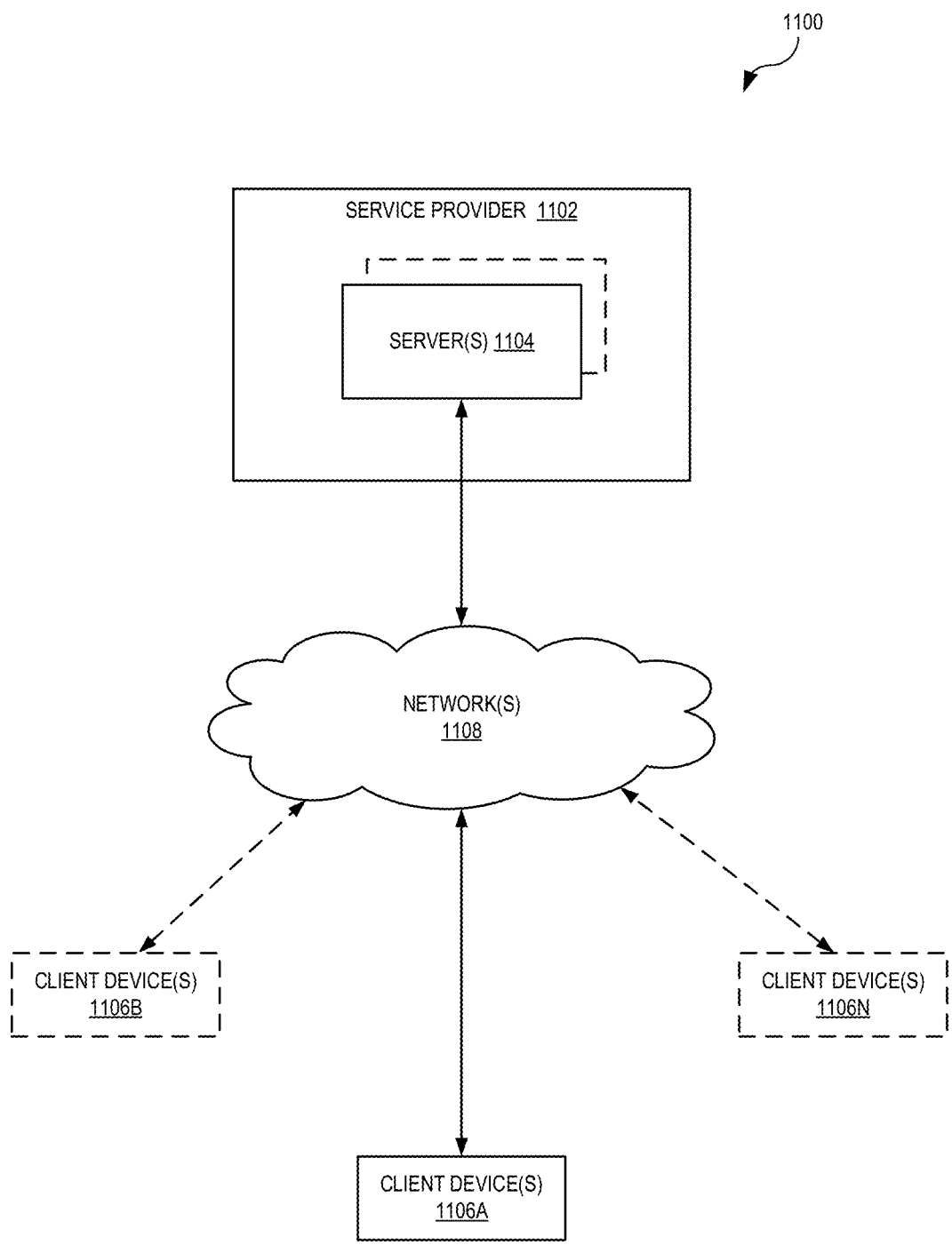
FIG. 11 illustrates a schematic diagram of an exemplary environment in which the image processing system can operate in accordance with one or more embodiments.

FIG. 11 illustrates a schematic diagram of an exemplary environment 1100 in which the deblurring system 802 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the deblurring system 802. In particular, the deblurring system 802 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including training frames 822, input video 824, kernel data 826, output video 828, feature data 830, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the deblurring system 802. In particular, the deblurring system 802 can comprise an application running on the one or more servers 1104 or a portion of the deblurring system 802 can be downloaded from the one or more servers 1104. For example, the deblurring system 802 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital videos (e.g., the input video 824, such as camera roll or an individual's personal videos) stored at the one or more servers 1104. Moreover, the client device 1106A can receive a request (i.e., via user input) to a blurry input video and provide the request to the one or more servers 1104. Upon receiving the request, the one or more servers 1104 can automatically perform the methods and processes described above to deblur videos. The one or more servers 1104 can provide all or portions of the deblurred output video to the client device 1106A for display to the user.

As just described, the deblurring system 802 may be implemented in whole, or in part, by the individual elements 1102-1108 of the environment 1100. It will be appreciated that although certain components of the deblurring system 802 are described in the previous examples with regard to particular elements of the environment 1100, various alternative implementations are possible. For instance, in one or more embodiments, the deblurring system 802 is implemented on any of the client devices 1106A-N. Similarly, in one or more embodiments, the deblurring system 802 may be implemented on the one or more servers 1104. Moreover, different components and functions of the deblurring system 802 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
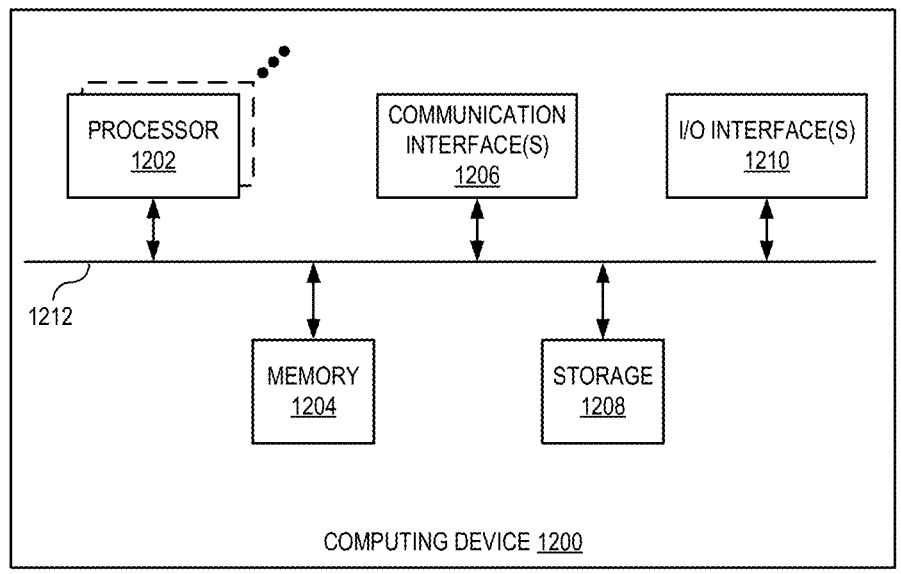
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
receiving an input frame from a digital video;
providing a combined input to a neural network, the combined input including the input frame, a previous input frame, and a corresponding previous output frame;
extracting a plurality of combined features of the combined input using an encoder network;
determining, using the neural network, a plurality of spatial alignment kernels and a plurality of deblur kernels each corresponding to a feature of the plurality of combined features, wherein the plurality of spatial alignment kernels include different sizes of spatial alignment kernels and wherein the plurality of deblur kernels include different sizes of deblur kernels;
padding the plurality of deblur kernels such that each of the plurality of deblur kernels is of equal size;
averaging the plurality of padded deblur kernels;
convolving the average of the plurality of padded deblur kernels with a plurality of features of the input frame to obtain a first convolved result;
generating, by the neural network, a plurality of output features for the input frame using the plurality of spatial alignment kernels and the first convolved result; and
generating a deblurred output frame from the plurality of output features using a decoder network.

2. The computer-implemented method of claim 1 wherein the plurality of spatial alignment kernels include different sizes of spatial alignment kernels and wherein the plurality of deblur kernels include different sizes of deblur kernels, further comprises:
predicting, by the neural network, a plurality of pairs of one-dimensional deblur filters corresponding to the plurality of deblur kernels for each feature from the plurality of combined features; and
predicting, by the neural network, a plurality of pairs of one-dimensional spatial alignment filters corresponding to the plurality of spatial alignment kernels for each feature from the plurality of combined features.

3. The computer-implemented method of claim 2, wherein generating, by the neural network, a plurality of output features for the input frame using the plurality of spatial alignment kernels and the plurality of deblur kernels, further comprises:
convolving the plurality of spatial alignment kernels with a plurality of features of the previous output frame to obtain a second convolved result; and
concatenating the first convolved result with the second convolved result to generate the plurality of output features.

4. The computer-implemented method of claim 3, wherein convolving the plurality of spatial alignment kernels with a plurality of features of the previous output frame to obtain a second convolved result, further comprises:
padding the plurality of spatial alignment kernels such that each of the plurality of spatial alignment kernels is of equal size;
averaging the plurality of padded spatial alignment kernels; and
convolving the average of the plurality of padded spatial alignment kernels with the plurality of features of the previous output frame to obtain the second convolved result.

5. The computer-implemented method of claim 3, further comprising:
downsampling the plurality of output features to generate a plurality of downsampled output features;
storing the plurality of downsampled output features for processing a next frame; and
storing the plurality of combined features for processing the next frame.

6. The computer-implemented method of claim 1, wherein the neural network is a multi kernel adaptive separable convolution network (MKASCN).

7. The computer-implemented method of claim 1, further comprising:
sequentially processing each frame of the digital video to obtain a deblurred output video.

8. A non-transitory computer-readable storage medium including instructions stored there on which, when executed by at least one processor, cause the at least one processor to:
receive an input frame from a digital video;

provide a combined input to a neural network, the combined input including the input frame, a previous input frame, and a corresponding previous output frame;
extract a plurality of combined features of the combined input using an encoder network;
determine, using the neural network, a plurality of spatial alignment kernels and a plurality of deblur kernels each corresponding to a feature of the plurality of combined features, wherein the plurality of spatial alignment kernels include different sizes of spatial alignment kernels and wherein the plurality of deblur kernels include different sizes of deblur kernels;
pad the plurality of deblur kernels such that each of the plurality of deblur kernels is of equal size;
average the plurality of padded deblur kernels;
convolve the average of the plurality of padded deblur kernels with a plurality of features of the input frame to obtain a first convolved result;
generate, by the neural network, a plurality of output features for the input frame using the plurality of spatial alignment kernels and the first convolved result; and
generate a deblurred output frame from the plurality of output features using a decoder network.

9. The non-transitory computer-readable storage medium of claim 8, wherein the plurality of spatial alignment kernels include different sizes of spatial alignment kernels and wherein the plurality of deblur kernels include different sizes of deblur kernels, the instructions, when executed, further cause the at least one processor to:
predict, by the neural network, a plurality of pairs of one-dimensional deblur filters corresponding to the plurality of deblur kernels for each feature from the plurality of combined features; and
predict, by the neural network, a plurality of pairs of one-dimensional spatial alignment filters corresponding to the plurality of spatial alignment kernels for each feature from the plurality of combined features.

10. The non-transitory computer-readable storage medium of claim 9, wherein to generate, by the neural network, a plurality of output features for the input frame using the plurality of spatial alignment kernels and the plurality of deblur kernels, the instructions, when executed, further cause the at least one processor to:
convolve the plurality of spatial alignment kernels with a plurality of features of the previous output frame to obtain a second convolved result; and
concatenate the first convolved result with the second convolved result to generate the plurality of output features.

11. The non-transitory computer-readable storage medium of claim 10, wherein to convolving the plurality of spatial alignment kernels with a plurality of features of the previous output frame to obtain a second convolved result, the instructions, when executed, further cause the at least one processor to:
pad the plurality of spatial alignment kernels such that each of the plurality of spatial alignment kernels is of equal size;
average the plurality of padded spatial alignment kernels; and
convolve the average of the plurality of padded spatial alignment kernels with the plurality of features of the previous output frame to obtain the second convolved result.

12. The non-transitory computer-readable storage medium of claim 10, wherein the instructions, when executed, further cause the at least one processor to:
downsample the plurality of output features to generate a plurality of downsampled output features;
store the plurality of downsampled output features for processing a next frame; and
store the plurality of combined features for processing the next frame.

13. The non-transitory computer-readable storage medium of claim 8, wherein the neural network is a multi kernel adaptive separable convolution network (MKASCN).

14. The non-transitory computer-readable storage medium of claim 8, wherein the instructions, when executed, further cause the at least one processor to:
sequentially process each frame of the digital video to obtain a deblurred output video.

15. A method comprising:
receiving a request to deblur a digital video, the request including at least a reference to the digital video;
obtaining the digital video;
processing a plurality of frames of the digital video in sequence by a multi kernel adaptive separable convolution network (MKASCN) to generate a deblurred and spatially aligned output video spatially aligned output video, wherein processing the plurality of frames includes:
providing a combined input to the MKASCN, the combined input including an input frame from the digital video, a previous input frame, and a corresponding previous output frame;
extracting a plurality of combined features of the combined input using an encoder network;
determining, using the MKASCN, a plurality of spatial alignment kernels corresponding to a feature of the plurality of combined features, and a plurality of deblur kernels corresponding to a feature of the plurality of combined features,
padding the plurality of spatial alignment kernels such that each of the plurality of spatial alignment kernels is of equal size,
averaging the plurality of padded spatial alignment kernels,
convolving the average of the plurality of padded spatial alignment kernels with a plurality of features of the previous output frame to obtain a first convolved result, and
generating a deblurred output frame corresponding to a frame of the plurality of frames using the plurality of deblur kernels and the first convolved result; and
returning the deblurred and spatially aligned output video.

16. The method of claim 15, further comprises:
generating, by the MKASCN, a plurality of output features for the input frame using the plurality of spatial alignment kernels and the plurality of deblur kernels;
generating a deblurred output frame from the plurality of output features using a decoder network; and
sequentially processing each frame of the digital video to obtain the deblurred and spatially aligned output video.

17. The method of claim 16, further comprises:
predicting, by the MKASCN, a plurality of pairs of one-dimensional deblur filters corresponding to the plurality of deblur kernels for each feature from the plurality of combined features; and
predicting, by the MKASCN, a plurality of pairs of one-dimensional spatial alignment filters corresponding to the plurality of spatial alignment kernels for each feature from the plurality of combined features.

18. The method of claim 17, wherein generating, by the MKASCN, a plurality of output features for the input frame using the plurality of spatial alignment kernels and the plurality of deblur kernels, further comprises:
   convolving the plurality of deblur kernels with the plurality of features of the input frame to obtain a second convolved result; and
   concatenating the first convolved result with the second convolved result to generate the plurality of output features.

* * * * *